L. HÄRTEL & L. KISSLING.
APPARATUS FOR USE IN TWISTING METAL RODS OR BARS.
APPLICATION FILED MAY 8, 1908.
983,896.
Patented Feb. 14, 1911.
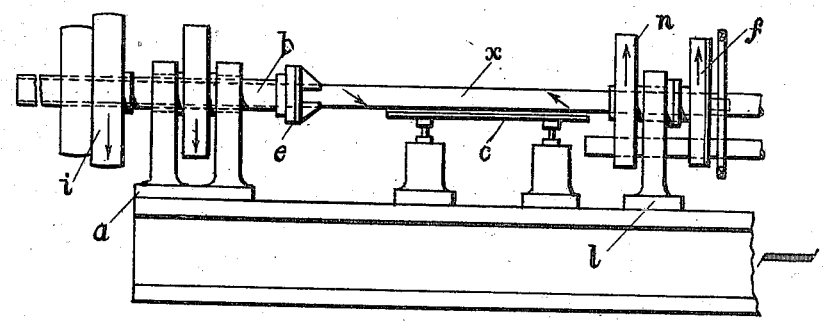
FIG. 1.
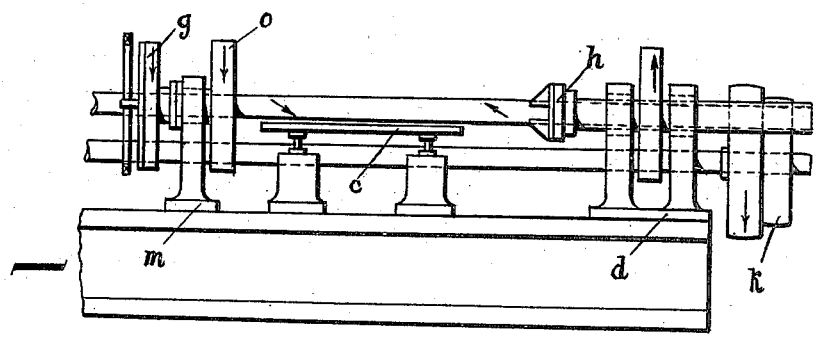
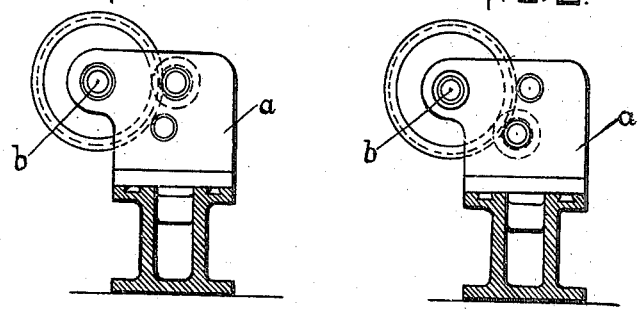
FIG. 2.    FIG. 3.
Witnesses:
Mary W. Darg.
N. K. Boulder
Inventors
Louis Härtel
Ludwig Kissling
By Wm E Boulder
Attorney
THE NORRIS PETERS CO., WASHINGTON, D. C.

UNITED STATES PATENT OFFICE.

LOUIS HÄRTEL AND LUDWIG KISSLING, OF REMSCHEID, GERMANY.

APPARATUS FOR USE IN TWISTING METAL RODS OR BARS.

983,896.      Specification of Letters Patent.      Patented Feb. 14, 1911.

Application filed May 8, 1908. Serial No. 431,601.

*To all whom it may concern:*

Be it known that we, LOUIS HÄRTEL and LUDWIG KISSLING, subjects of the German Emperor, both residing at Remscheid, Germany, have invented a certain new and useful Apparatus for Use in Twisting Metal Rods or Bars, of which the following is a specification.

This invention relates to apparatus for the helical twisting of metal rods or bars.

Figure 1 shows the machine in front elevation, Fig. 2 is the left and Fig. 3 is the right hand side elevation.

The arrangement and the working of the machine are as follows:—The bar $x$ while still incandescent as it would be for instance on emerging from a rolling mill is suitably fed into the hollow spindle $b$ arranged in the head stock $a$, passes over the support and protective troughs $c$ to the head stock $d$ at the other end, in order that it may then be fixed by means of the chucks $e\ f\ g\ h$, whereupon the machine is started.

The twisting of the bar $x$ or of each half of it between the chucks $e$—$f$, $g$—$h$ is effected owing to the machine being driven by the two driving pulleys $i$ and $k$ in one and the same direction of rotation, that is in such manner that the driving pulley $i$ is keyed direct to the driving spindle, while the driving pulley $k$ is mounted on a countershaft. In that way two chucks $e$—$h$ are rotated in opposite directions. As the two chucks $f$—$g$ must rotate in opposite directions to each other and to the chuck arranged opposite them, the two central driving gears are arranged or driven alternately, that is to say the left hand gear $n$ is driven by $k$, and the right hand gear $o$ by $i$, whereby the directions of rotation shown in Fig. 1 are obtained, and thus the bar $x$ or the halves of the bar, are simultaneously and uniformly twisted at both sides between the chucks $e$—$f$, $g$—$h$. In the center between the chucks $f$—$g$ the bar is automatically broken or twisted off owing to its being fixed along a short length and to the consequent excessive twist.

The chief advantage of the machine according to this invention consists in the fact that it is possible to treat in the shortest possible time two bars of any desired length, and that the bar is automatically broken or twisted off in the center.

What we claim as our invention and desire to secure by Letters Patent is:—

In a machine of the character described the combination of a plurality of hollow spindles removed from but in line with each other and adapted to receive a rod to be twisted, rod-holding chucks $e, f, g, h$, mounted upon said spindles, a driving pulley $i$ keyed on one of said spindles constituting a driving spindle, a countershaft, a second driving pulley $k$ keyed on said countershaft, and gearing between the driving spindle and the countershaft whereby the chuck $e$ will be rotated in a direction opposite to the direction of rotation of chuck $f$, and the chuck $g$ rotated in a direction opposite to the direction of rotation of chuck $h$, said chucks $f$ and $g$ being rotated in opposite directions to each other in the manner and for the purpose set forth.

In testimony whereof we have signed our names to this specification in the presence of two subscribing witnesses.

LOUIS HÄRTEL. [L. S.]
    LUDWIG KISSLING. [L. S.]

Witnesses:
  OTTO KÖNIG,
  WILHELM FRIEDERICHS.